US008279231B1

(12) United States Patent
Duncan et al.

(10) Patent No.: US 8,279,231 B1
(45) Date of Patent: Oct. 2, 2012

(54) BANDWIDTH IMPEDANCE MATCHING AND STARVATION AVOIDANCE BY READ COMPLETION BUFFER ALLOCATION

(75) Inventors: Samuel Hammond Duncan, Arlington, MA (US); John H. Edmondson, Arlington, MA (US); Raymond Hoi Man Wong, Santa Clara, CA (US); Lukito Muliadi, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1008 days.

(21) Appl. No.: 12/260,985

(22) Filed: Oct. 29, 2008

(51) Int. Cl.
*G06F 12/02* (2006.01)
(52) U.S. Cl. .................. 345/543; 711/E12.002
(58) Field of Classification Search .......... None
See application file for complete search history.

(56) References Cited

U.S. PATENT DOCUMENTS

| 5,768,544 | A  | * | 6/1998 | Hauck | 710/118 |
|---|---|---|---|---|---|
| 6,771,269 | B1 | * | 8/2004 | Radecki et al. | 345/503 |
| 7,728,842 | B2 | * | 6/2010 | Honmi | 345/543 |
| 7,969,512 | B2 | * | 6/2011 | Wiercienski et al. | 348/718 |
| 2005/0204185 | A1 | * | 9/2005 | Tait et al. | 714/5 |
| 2006/0015699 | A1 | * | 1/2006 | Fujiwara et al. | 711/162 |
| 2009/0138597 | A1 | * | 5/2009 | Isaac et al. | 709/225 |

* cited by examiner

*Primary Examiner* — Daniel Washburn
*Assistant Examiner* — Donna Ricks
(74) *Attorney, Agent, or Firm* — Patterson & Sheridan, LLP

(57) ABSTRACT

Read completion buffer space is allocated in accordance with a preset limit. When a read request is received from a client, the sum of a current allocation of the read completion buffer space and a new allocation of the read completion buffer space required by the read request is compared with the preset limit. If the preset limit is not exceeded, read completion buffer space is allocated to the read request. If the preset limit is exceeded, the read request is suspended until sufficient data is read out from the read completion buffer.

20 Claims, 5 Drawing Sheets

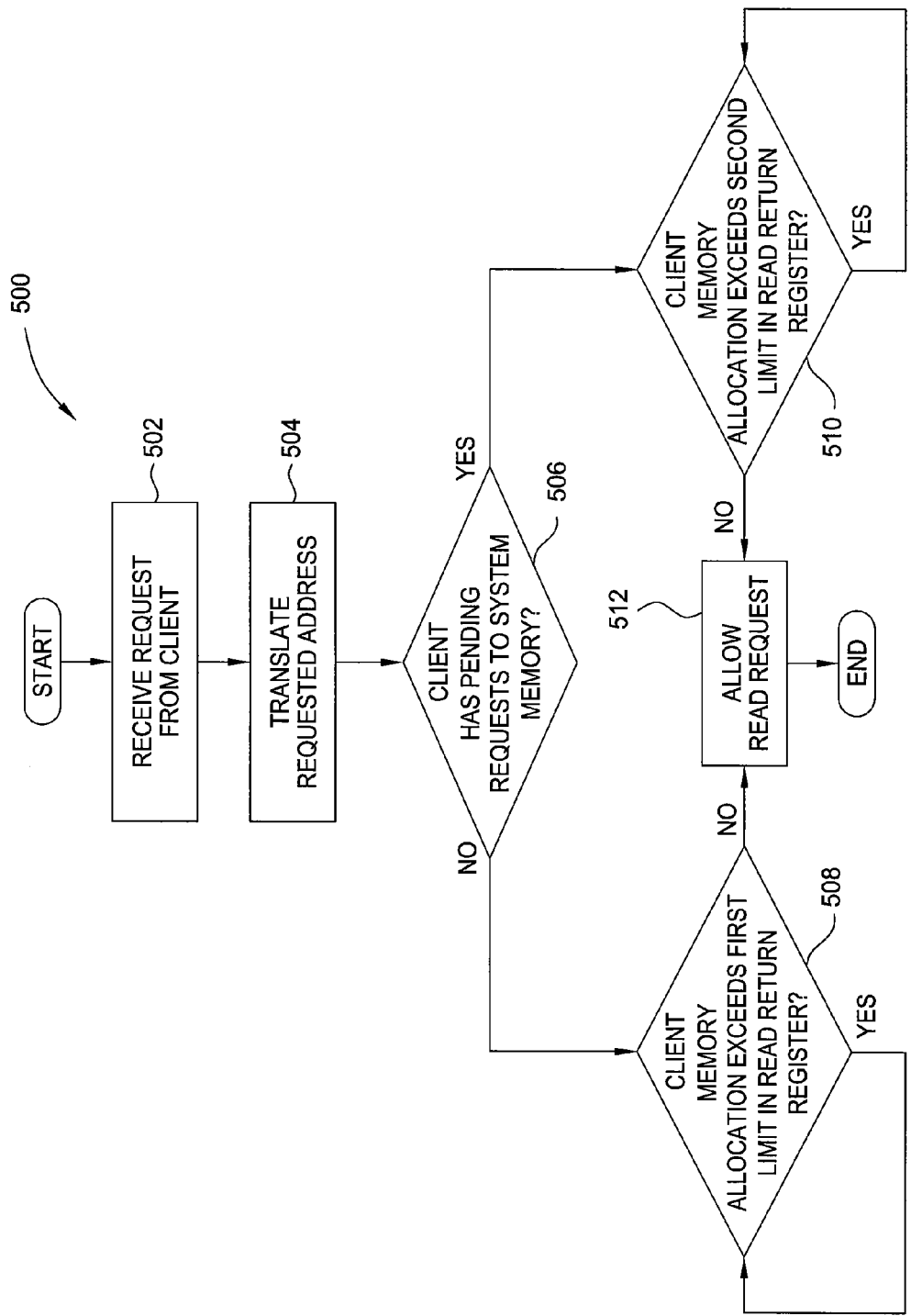

BANDWIDTH IMPEDANCE MATCHING AND STARVATION AVOIDANCE BY READ COMPLETION BUFFER ALLOCATION

BACKGROUND OF THE INVENTION

1. Field of the Invention

The present invention generally relates to computer hardware. More specifically, the present invention relates to bandwidth impedance matching and starvation avoidance by read completion buffer allocation.

2. Description of the Related Art

A modern computer system may be implemented with a processor that executes many operations in parallel known as a parallel processing unit (PPU). PPUs are generally managed by one or more engines, or clients, that perform operations such as memory management, graphics display, instruction fetching, encryption, and other operations.

As clients carry out operations, they make requests to read data from parallel processor (PP) local memory or from system memory. The requested data may be returned from memory in fragments that require reassembly. One way to accomplish reassembly would be to store each fragment of the requested data in temporary storage until all of the fragments have returned. The requested data could then be reassembled from the fragments and returned to the client.

If a client issued read requests faster than it can consume read data, the temporary storage might fill up with data fragments faster than those fragments could be reassembled and returned to the client. For example, a client with a 16-byte wide read completion interface can only read 16 bytes per clock cycle, but might issue read requests of larger sizes (e.g., 256 bytes) every clock cycle. In such a case, the temporary storage would quickly become consumed. If this client shared the temporary storage resource with other clients, those clients would be prevented from making use of the temporary storage and would be starved of the requested read data.

SUMMARY OF THE INVENTION

Embodiments of the present invention provide a method and a system for allocating read completion buffer space in accordance with one or more preset limits that are defined for clients that are issuing read requests.

A method for allocating read completion buffer space, according to an embodiment of the invention, includes the steps of receiving a read request from a client, determining that a read completion buffer space allocated to the client will not exceed a preset upper bound as a result of allocating read completion buffer space required by the read request, and allocating read completion buffer space for the read request. In the case where a read request would cause the amount of buffer space allocated to a client to exceed a preset upper bound, the read request is stalled until the amount of buffer space allocated to the client decreases sufficiently.

A method for allocating read completion buffer space, according to another embodiment of the invention includes the steps of receiving a read request from a client, retrieving a first preset limit if the read request is to system memory and a second preset limit if the read request is to local memory, and allocating read completion buffer space for the read request based on a comparison with at least one of the first and second preset limits. If the read request is a read request to system memory, the sum of a current allocation of read completion buffer space and a new allocation of read completion buffer space required by the read request is compared with the first preset limit. If the read request is a read request to local memory, the sum of a current allocation of read completion buffer space and a new allocation of read completion buffer space required by the read request is compared with the second preset limit.

A computer system according to an embodiment of the invention includes a first memory unit, a second memory unit, a plurality of clients that generate requests to read data from the first memory unit and the second memory unit, and an input/output unit that processes the requests to read data from the clients, wherein the input/output unit includes a read completion buffer and stores first and second read completion buffer allocation limits for each of the clients. The input/output unit is configured to limit the amount of read completion buffer that is allocated to requests from a client to read data from the first memory unit in accordance with the first read completion buffer allocation limit for the client, and to limit the amount of read completion buffer that is allocated to requests from a client to read data from the second memory unit in accordance with the second read completion buffer allocation limit for the client.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 5 is a flowchart of method steps for limiting read requests from a client from being issued according to another embodiment of the invention.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
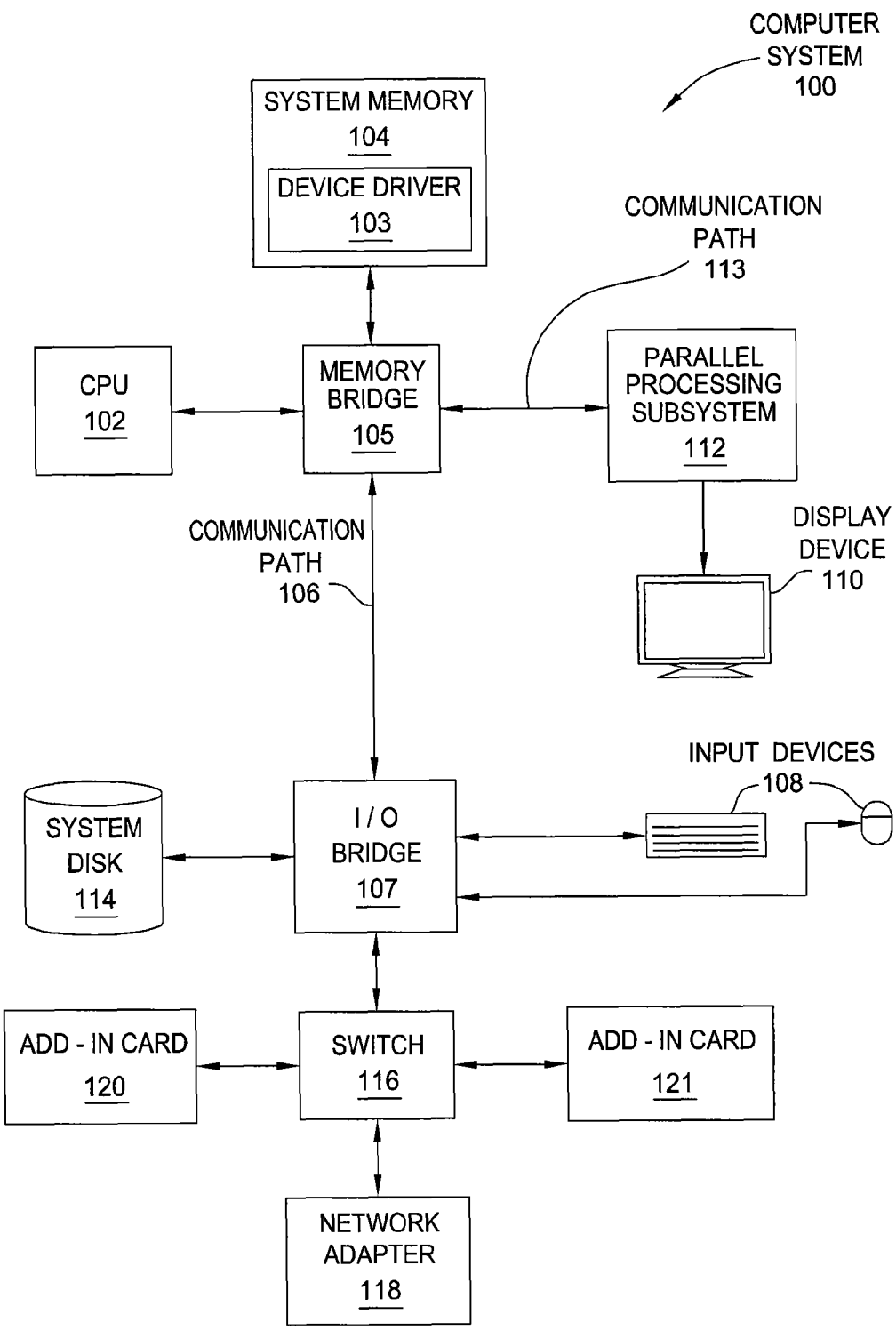
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a bus path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
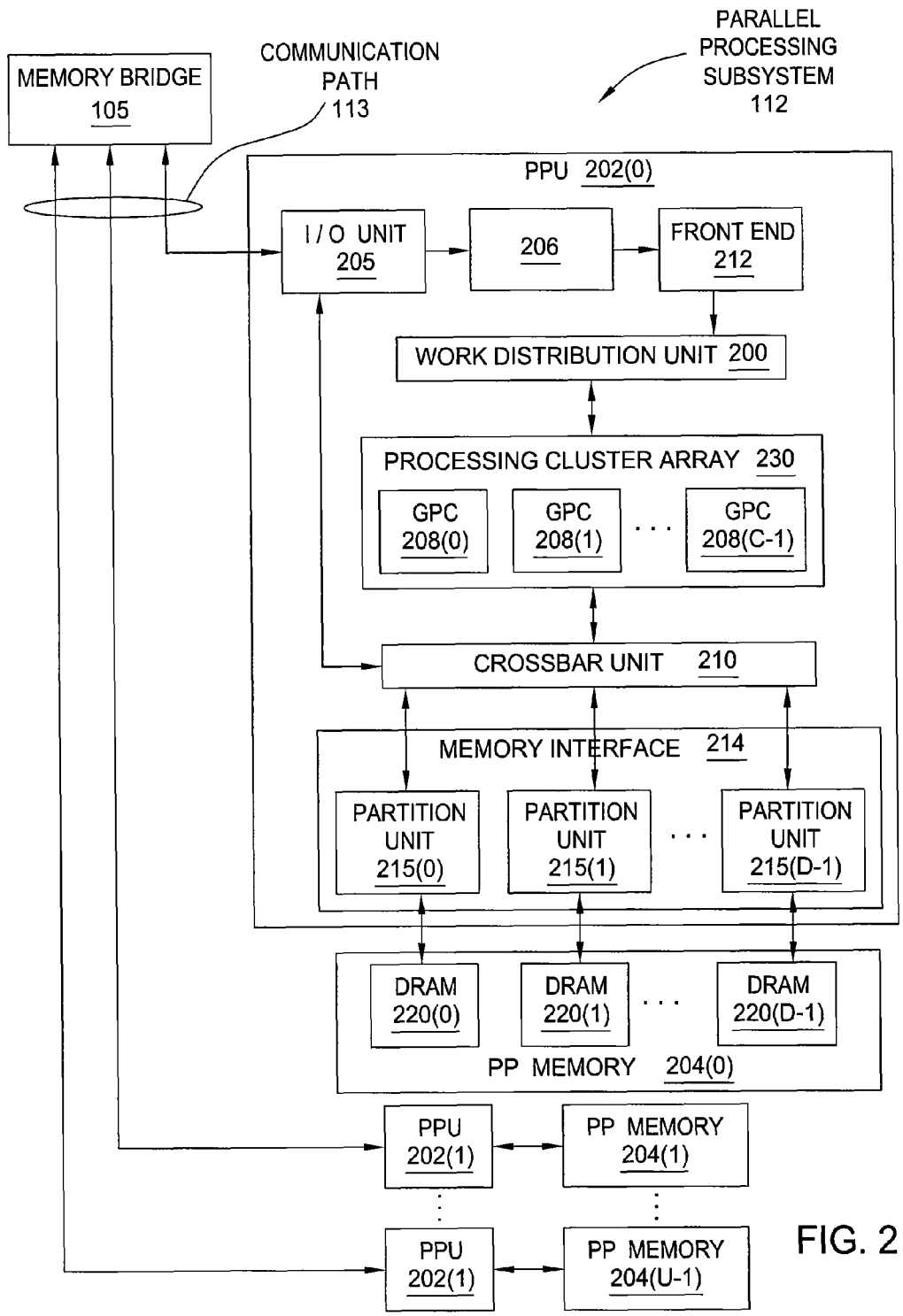
FIG. 2 is a block diagram of a parallel processing subsystem for the computer system of FIG. 1.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≧1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-E link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≧1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D 1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the partition units 215 within parallel processing memory 204. Crossbar unit 210 is configured to route the output of each GPC 208 to the input of any partition unit 214 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-E) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Figure 3:
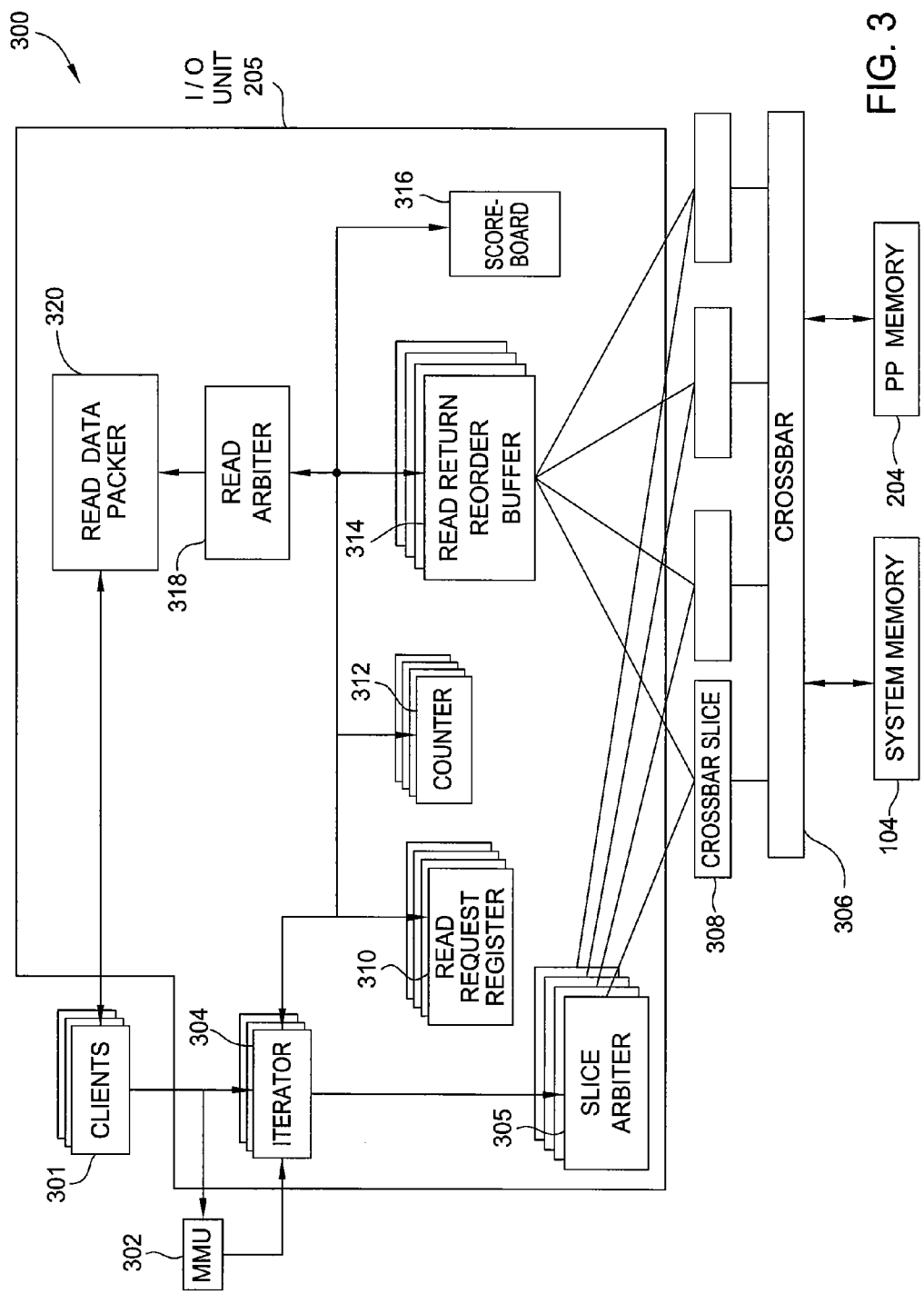
FIG. 3 is a block diagram of components of the parallel processing subsystem of FIG. 2 that handle read requests from clients.

FIG. 3 is a block diagram of components of a PPU 202 that handle read requests from clients. As shown, FIG. 3 includes one or more clients 301 that issue read requests to system memory 104 and PP memory 204. Clients 301 include host interface 206, front end 212, and engines that perform operations such as memory management, graphics display, instruction fetching, encryption, and other operations. Read requests issued by clients 301 include a virtual address and size of the data. The virtual address in each of these requests is transmitted by clients 301 to a memory management unit (MMU) 302 that translates the virtual address into a physical address and transmits the physical address to an iterator 304 via a client arbiter 303. Iterator 304 translates the physical address into a crossbar (x-bar) raw address that indicates a x-bar slice 308 from which the requested data will be returned and the memory unit that stores the requested data. Iterator 304 is connected to each x-bar slice 308 via a slice arbiter 305. Slice arbiter 305 receives the x-bar raw address from the iterator 304 and transmits the request to the correct x-bar slice 308.

Requests are sent to system memory 104 or PP memory 204 through x-bar slices 308 and crossbar 306. System memory 104 and PP memory 204 return the requested data as fragments through the x-bar slices 308. Returned data fragments from a particular x-bar slice 308 are stored temporarily in a read return reorder buffer (RRRB) 314 connected to that x-bar slice 308.

Associated with each RRRB 314 is a counter 312 that keeps track of the amount of available space in RRRB 314. Counter 312 is incremented when requests are transmitted to the x-bar slice 308 associated with RRRB 314 and decremented when the returned data fragments are read from RRRB 314. Iterator 304 checks the value of counter 312 before it sends requests to x-bar slices 308. When counter 312 is at its maximum value, iterator 304 stalls the request until counter 312 is decremented, indicating that space in RRRB 314 has become available.

Associated with each of clients 301 is a read request register (RRR) 310 that stores two preset limits. The first limit establishes for a client an upper bound on the total amount of space in RRRB 314 that can be allocated to the client for data returning from system memory 104 in response to its read requests. The second limit establishes for a client an upper bound on the total amount of space in RRRB 314 that can be allocated to client 301 for data returning from PP memory 204 in response to its read requests. Thus, even though space is available in RRRB 314, arbiter 318 might cause iterator 304 to stall a request from a client in accordance with preset limits specified in RRR 310 for that client.

For example, if a client submits a new read request of N bytes from system memory 104 and the total amount of space in RRRB 314 allocated to the client for data returning from system memory 104 is large enough such that the first limit will be exceeded with the new read request, arbiter 318 will cause iterator 304 to stall this new read request until the amount of space in RRRB 314 allocated to client 301 for data returning from system memory 104 decreases sufficiently. Also, if a client submits a new read request of N bytes from PP memory 204 and the total amount of space in RRRB 314 allocated to client 301 for data returning from PP memory 204 is large enough such that the second limit will be exceeded with the new read request, arbiter 318 will cause iterator 304 to stall this new read request until the total amount of space in RRRB 314 allocated to client 301 for data returned from read requests to PP memory 204 decreases sufficiently.

Each of the preset limits is calculated based on the read completion interface size of client 301 and the latency period associated with that memory unit. For example, if a client has a peak bandwidth of 16 bytes per clock cycle and a read request to system memory 104 has a latency of 100 clock cycles, the limit associated with system memory 104 for this client is calculated as: 16 Bytes/clock cycle*100 clock cycles=1.6 kB, and the first preset limit of RRR 310 corresponding to this client would be set as 1.6 kB. Similarly, if a client has a peak bandwidth of 16 bytes per clock cycle and a read request to PP memory 204 has a latency of 20 clock cycles, the limit associated with PP memory 204 for this client is calculated as: 16 Bytes/clock cycle*20 clock cycles=320 Bytes, and the second preset limit of RRR 310 corresponding to this client would be set as 320 Bytes.

In the embodiment described above, each preset limit specified in RRR 310 is independently applied to determine whether or not additional read requests can be made to system memory 104 or PP memory 204. For example, additional read requests can be made to system memory 104 so long as the first limit is not exceeded and additional read requests can be made to PP memory 204 so long as the second limit is not exceeded.

In an alternative embodiment, the first limit specified in RRR 310 is applied to prevent a client that does not have pending read requests to system memory 104 from issuing an additional read request to system memory 104 or PP memory 204 if doing so causes the total amount of space in RRRB 314 allocated to client 301 for data returning from either system memory 104 or PP memory 204 to exceed this limit. Alternatively, the second limit specified in RRR 310 is applied to prevent a client that has pending read requests to system memory 104 from issuing an additional read request to system memory 104 or PP memory 204 if doing so causes the total amount of space in RRRB 314 allocated to client 301 for data returning from either system memory 104 or PP memory 204 to exceed this limit.

Figure 4:
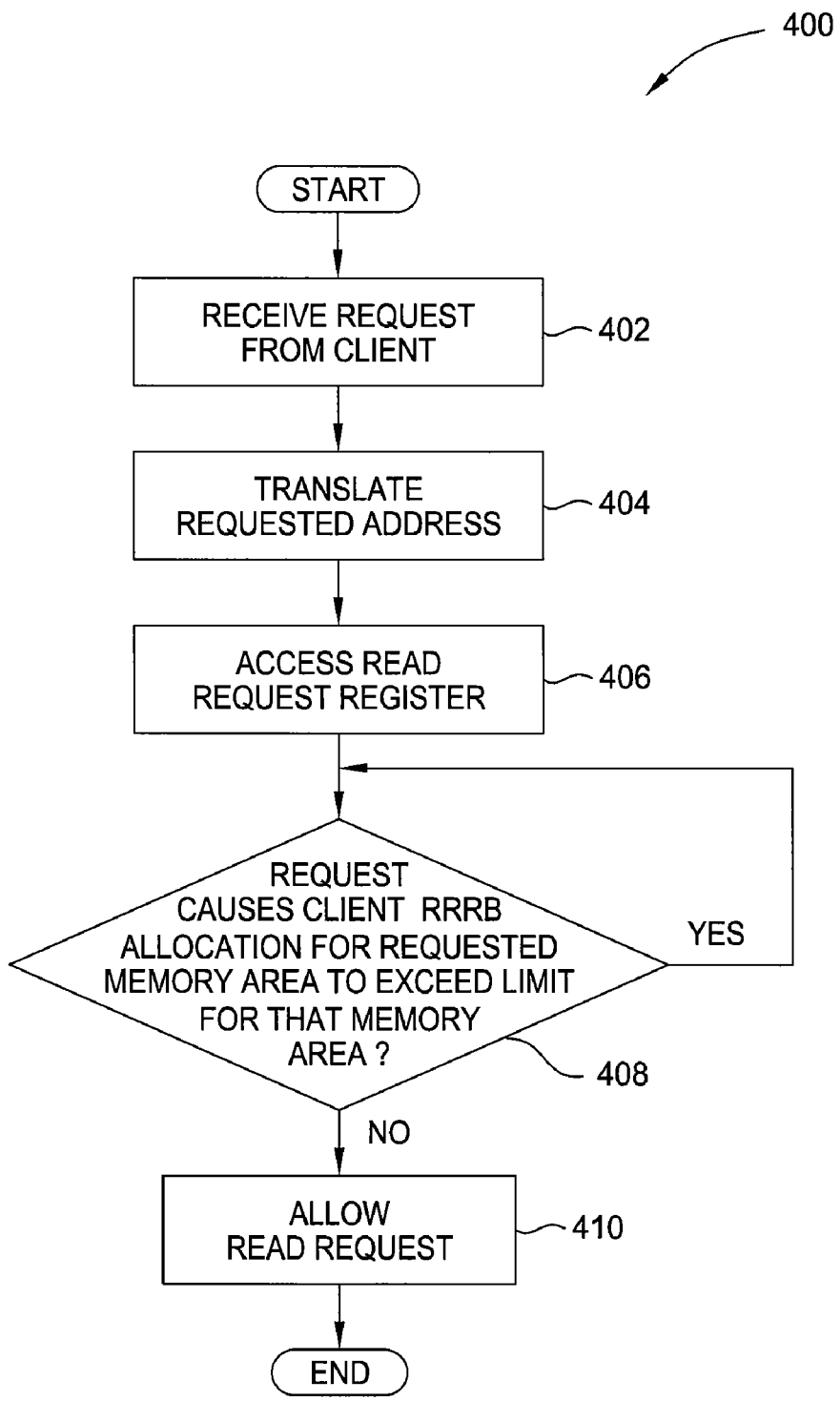
FIG. 4 is a flowchart of method steps for limiting read requests from a client from being issued according to an embodiment of the invention.

FIG. 4 is a flowchart of method steps for limiting read requests from a client from being issued according to one embodiment of the invention. Persons skilled in the art will understand that, even though the method 400 is described in conjunction with the systems of FIGS. 1, 2 and 3, any system configured to perform the method steps, in any order, is within the scope of the present invention.

The method 400 begins at step 402, where a read request to a memory unit is received from client 301 that includes a virtual address and the size of the read operation. At step 404, the virtual address specified in the request is translated into a physical address and the physical address is translated into a crossbar raw address. As a result of this address translation, it can be determined whether the read request is made to system memory 104 or PP memory 204. At step 406, arbiter 318 accesses RRR 310 associated with client 301 and determines whether the space in RRRB 314 allocated to client 301 for data returning from the requested memory unit would exceed the limit specified in RRR 310 for that memory unit. If the limit would be exceeded, the request is not allowed until client 301 read out sufficient data from RRRB 314. If the limit would not be exceeded, the method 400 advances to step 410 and the read request is allowed. The method 400 then terminates.

FIG. 5 is a flowchart of method steps for limiting read requests from a client from being issued according to another embodiment of the invention. Persons skilled in the art will understand that, even though the method 500 is described in conjunction with the systems of FIGS. 1, 2 and 3, any system configured to perform the method steps, in any order, is within the scope of the present invention.

The method 500 begins at step 502, where a read request is received from client 301 that includes a virtual address and the size of the read operation. At step 504, the virtual address specified in the request is translated into a physical address and the physical address is translated into a crossbar raw address. As a result of this address translation, it can be determined whether the read request is made to system memory 104 or PP memory 204. At step 506, arbiter 318 determines whether the client 301 has pending read requests to system memory 104. If the client does not have pending read requests to system memory 104, then the method 500 advances to step 508.

At step 508, arbiter 318 examines the first limit stored in RRR 310. If the total amount of memory in RRRB 314 allocated to the client for data returning from either system memory 104 or PP memory 204 exceeds this limit, then arbiter 318 causes iterator 304 to stall the request until the total amount of space in RRRB 314 allocated to client 301 decreases sufficiently. If the total amount of memory in RRRB 314 allocated to the client for data returning from either system memory 104 or PP memory 204 does not exceed this limit, then the method 500 advances to step 512 and the read request is allowed.

If at step 506 client arbiter 318 determines that client 301 has pending read requests to system memory 104, then the method 500 advances to step 510. At step 510, arbiter 318 examines the second limit stored in RRR 310. If the total amount of memory in RRRB 314 allocated to the client for data returning from either system memory 104 or PP memory 204 exceeds this limit, then the request is stalled until the total amount of space in RRRB 314 allocated to client 301 decreases sufficiently. If the total amount of memory in RRRB 314 allocated to the client for data returning from either system memory 104 or PP memory 204 does not exceed this limit, then the method 500 advances to step 512 and the read request is allowed.

In sum, a programmable register, in one embodiment, stores preset limits to the amount of space in temporary storage allocated to a client for data returned from different memory units to RRRBs. The limits may be determined based on the latency period of each memory unit, the configuration of the computing system, or calculated based other factors.

In another embodiment, a first field in the programmable register stores a preset limit to the amount of temporary storage space allocated to a client when that client does not have pending reads to system memory, and a second field in the programmable register stores a preset limit to the amount of temporary storage space allocated to a client when that client has pending reads to system memory. The limits may be determined based on the latency period of each memory unit, the configuration of the computing system, or calculated based other factors.

Advantageously, the peak bandwidth required by each client is delivered because other clients are prevented from accumulating read data in the RRRB faster than that data can be read. Client bandwidth impedance is matched without over-allocating the RRRB to that client, thus preventing other clients from being starved of the shared memory resource.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

We claim:

1. A method for allocating read completion buffer space, comprising:
   receiving a read request from a client;
   determining that a read completion buffer space allocated to said client will not exceed a preset upper bound for said client as a result of allocating read completion buffer space required by the read request from said client; and
   allocating read completion buffer space for the read request from said client,
   wherein the preset upper bound comprises a first value when the read request is directed to system memory or a second value when the read request is directed to graphics memory, and wherein the preset upper bound is established by a limit that is computed as latency of reads from a memory multiplied by size of read completion interface of the client.

2. The method according to claim 1, wherein the read request from said client includes a request to read data from system memory, and the upper bound for said client is preset based on latency of reads from system memory and size of read completion interface of the client.

3. The method according to claim 1, wherein the read request from said client includes a request to read data from graphics memory, and the upper bound for said client is preset based on latency of reads from graphics memory and size of read completion interface of the client.

4. The method according to claim 1, further comprising:
   receiving another read request from a client;
   determining that a read completion buffer space allocated to said client will exceed a preset upper bound for said client as a result of allocating read completion buffer space required by the read request from said client; and
   suspending the read request from said client.

5. The method according to claim 4, further comprising:
   completing one or more read requests for said client;
   determining that the read completion buffer space allocated to said client will not exceed the preset upper bound for said client as a result of allocating read completion buffer space required by the suspended read request from said client;
   allocating read completion buffer space for the suspended read request from said client; and
   resuming the suspended read request from said client.

6. In an input/output unit for a processing unit that is interfaced with local memory and system memory, a method for allocating read completion buffer space for multiple clients, comprising:
   receiving a read request from a client;
   retrieving a first preset limit for said client from memory if the read request is to system memory and a second preset limit for said client from memory if the read request is to local memory; and
   allocating read completion buffer space for the read request based on a comparison with at least one of the first and second preset limits,
   wherein the first preset limit is computed as latency of reads from the system memory multiplied by size of read completion interface of the client, and the second preset limit is computed as latency of reads from the local memory multiplied by size of read completion interface of the client.

7. The method according to claim 6, further comprising:
   determining that the read request is a read request to system memory,
   wherein the comparison includes a comparison of a current allocation of read completion buffer space for said client and a new allocation of read completion buffer space required by the read request with the first preset limit.

8. The method according to claim 7, wherein the comparison is a comparison of the sum of the current allocation of read completion buffer space for read requests to system memory from said client and the new allocation of read completion buffer space required by the read request with the first preset limit.

9. The method according to claim 6, further comprising:
determining that the read request is a read request to local memory,
wherein the comparison includes a comparison of a current allocation of read completion buffer space for said client and a new allocation of read completion buffer space required by the read request with the second preset limit.

10. The method according to claim 9, wherein the comparison is a comparison of the sum of the current allocation of read completion buffer space for read requests to local memory from said client and the new allocation of read completion buffer space required by the read request with the second preset limit.

11. The method according to claim 6, further comprising:
receiving another read request from a client;
retrieving a first preset limit for said client from memory if the read request is to system memory and a second preset limit for said client from memory if the read request is to local memory; and
allocating read completion buffer space for the read request from said client based on a comparison with at least one of the first and second preset limits for said client.

12. In an input/output unit for a processing unit that is interfaced with local memory and system memory, a method for allocating read completion buffer space for multiple clients, comprising:
receiving a read request from a client;
retrieving a first preset limit for said client from memory if previous read requests to system memory are not pending for said client, and a second preset limit for said client from memory if previous read requests to system memory are pending for said client; and
allocating read completion buffer space for the read request based on a comparison with at least one of the first and second preset limits,
wherein the first preset limit and the second preset limit are computed as latency of reads from the system memory multiplied by size of read completion interface of the client.

13. The method according to claim 12, wherein the comparison is a comparison of the sum of the current allocation of read completion buffer space for read requests to system memory and to local memory from said client, and the new allocation of read completion buffer space required by the read request.

14. A computer system comprising:
a first memory unit;
a second memory unit;
a plurality of clients that generate requests to read data from the first memory unit and the second memory unit; and
an input/output unit that processes the requests to read data from the clients,
wherein the input/output unit includes a read completion buffer and stores read completion buffer allocation limits for the clients, and wherein the read completion buffer allocation limits for each of the clients comprises a first preset limit that is computed as latency of reads from the first memory unit multiplied by size of read completion interface of the client, and a second preset limit is computed as latency of reads from the second memory unit multiplied by size of read completion interface of the client.

15. The computer system according to claim 14, wherein the input/output unit stores first and second read completion buffer allocation limits for each of the clients.

16. The computer system according to claim 15, wherein the input/output unit is configured to limit the amount of read completion buffer that is allocated to requests from a client to read data from the first memory unit in accordance with the first read completion buffer allocation limit for said client.

17. The computer system according to claim 15, wherein the input/output unit is configured to limit the amount of read completion buffer that is allocated to requests from a client to read data from the second memory unit in accordance with the second read completion buffer allocation limit for said client.

18. The computer system according to claim 15, wherein the input/output unit is configured to limit the amount of read completion buffer that is allocated to requests from a client to read data from either the first memory unit or the second memory unit by comparing the total amount of read completion buffer allocated to the client, to the first read completion buffer allocation limit when the client does not have pending read requests to the first memory unit, and to the second read completion buffer allocation limit when the client has pending read requests to the first memory unit.

19. The computer system according to claim 14, further comprising a graphics processing unit, wherein the first memory unit is system memory and the second memory unit is local memory for the graphics processing unit.

20. The computer system according to claim 19, wherein the input/output unit is a non-isochronous hub for the graphics processing unit.

* * * * *